United States Patent
Martin

[15] 3,647,084
[45] Mar. 7, 1972

[54] FILTER
[72] Inventor: Henry Woods Martin, Houston, Tex.
[73] Assignee: William W. Nugent & Co., Inc., Skokie, Ill.
[22] Filed: Oct. 17, 1969
[21] Appl. No.: 867,242

[52] U.S. Cl............................................210/492, 210/488
[51] Int. Cl..........................................................B01d 25/18
[58] Field of Search..........................................210/488, 492

[56] References Cited
UNITED STATES PATENTS

| | | | |
|---|---|---|---|
| 2,495,095 | 1/1950 | Ewbank | 210/492 |
| 2,575,995 | 11/1951 | Briggs et al. | 210/492 X |
| 2,604,994 | 7/1952 | Vocelka | 210/492 |

*Primary Examiner*—John Adee
*Attorney*—Fitch, Even, Tabin & Luedeka

[57] ABSTRACT

A filter having a plurality of axially aligned and axially spaced flat annular discs of filtering material separated by inner and outer support members alternating axially with the respective discs and providing axial support for the discs while defining radial inlet and outlet openings communicating with the spaces between the discs for the flow of fluid axially through the discs.

5 Claims, 9 Drawing Figures

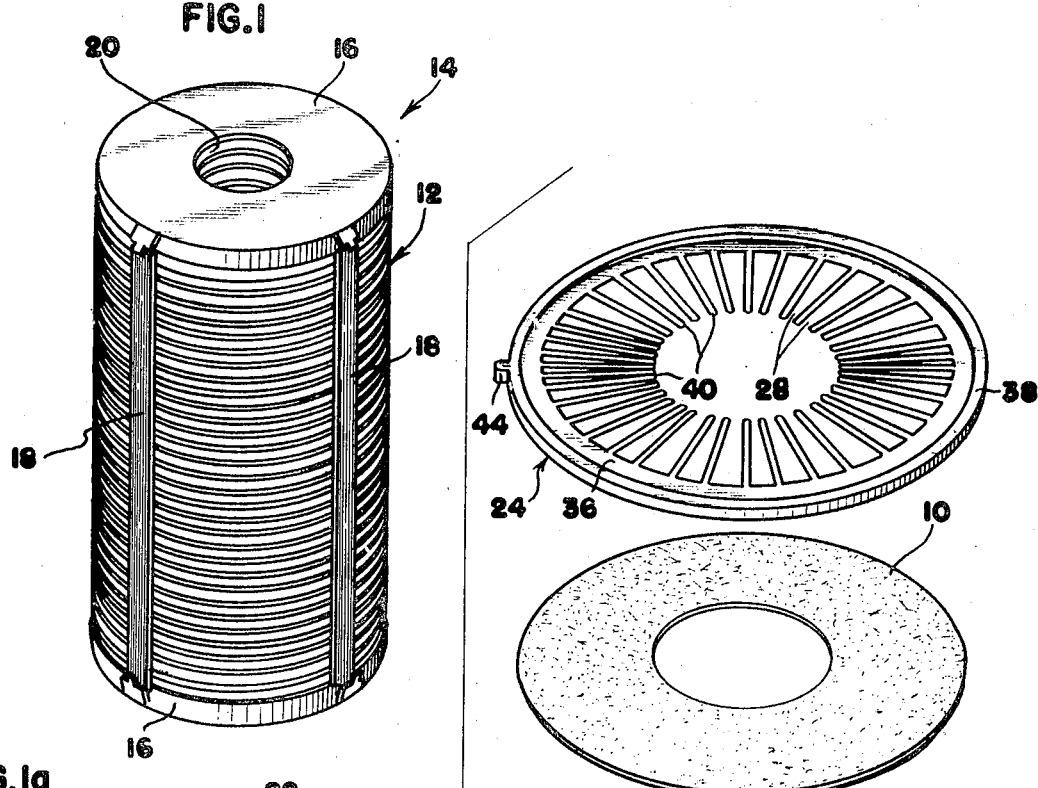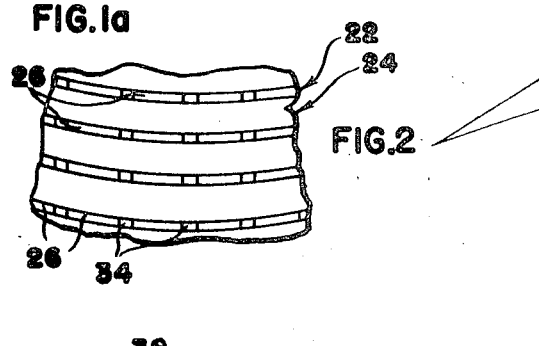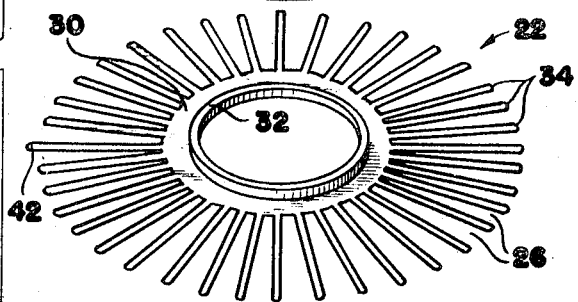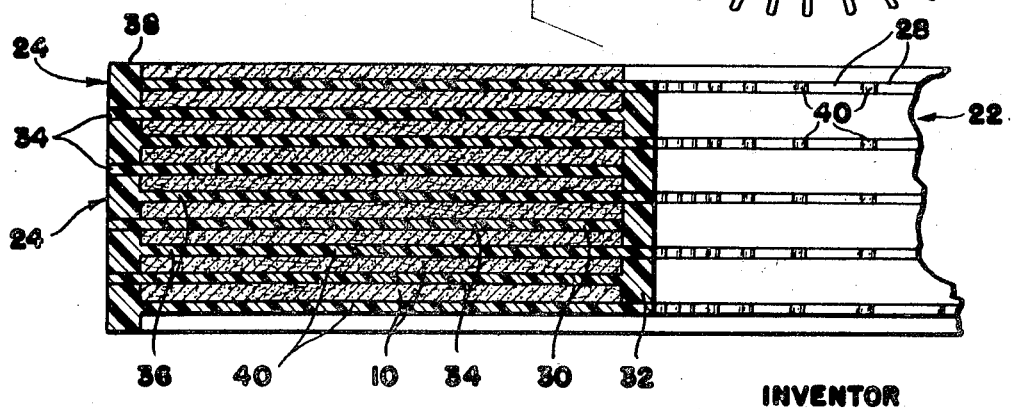

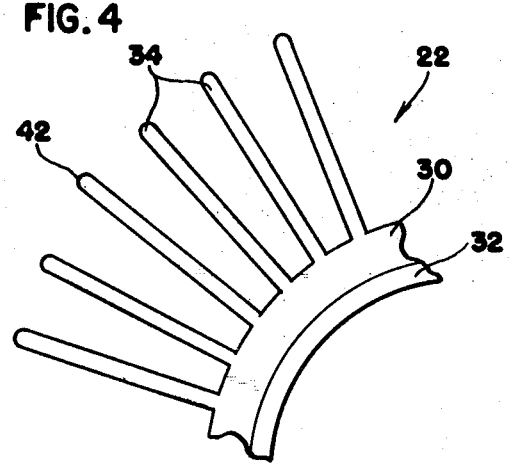
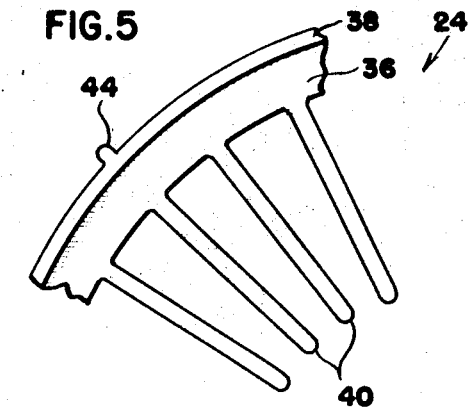
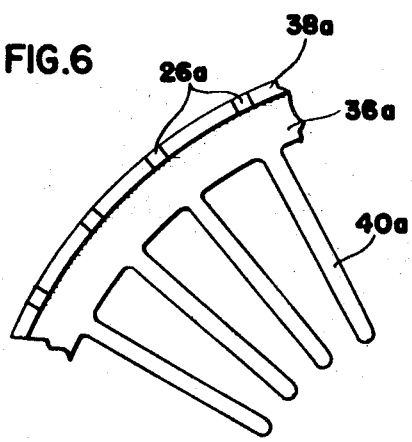
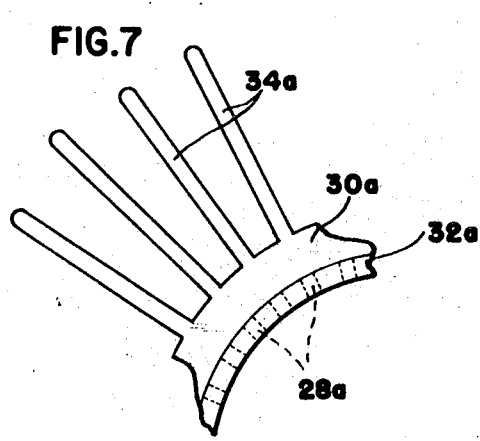
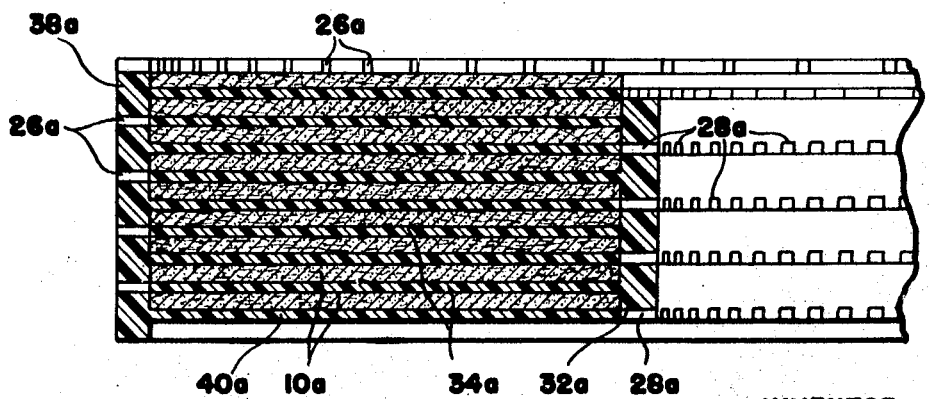

FILTER

The present invention relates generally to filters having cartridges formed from a plurality of flat annular discs of filter material arranged in axial alignment in a stack and adapted to filter fluid flowing axially through the discs between inlet and outlet passageways opening radially with respect to the stack at the peripheries of the discs. The invention relates more particularly to the specific means for supporting each disc.

One form of filter cartridge (sometimes referred to as a "recharge" which is used extensively in the filtering of liquids such as oil consists of a plurality of flat annular discs formed of a fibrous material such as woodpulp, paper, felt or the like and arranged in axial alignment with each other to form a stack. An example of such discs and a cartridge formed therefrom is found in U.S. Pat. No. 2,604,994 which issued July 29, 1952. During use, the cartridge is placed in a vessel or housing in communication with a conduit carrying fluid to be filtered and the fluid is pumped under pressure into and out of the vessel. In the cartridge, the fluid flows from the exterior of the stack first radially and inwardly through inlet passageways, then axially through the filter discs, and finally radially and inwardly through outlet passageways to the open inner periphery of the stack from which it flows to an outlet opening of the vessel. Within the cartridge, the parts thereof are retained in assembled relation by the application of an axial compressive force.

It is a principal object of the invention to provide, in a filter of the above character, novel means to support the filter discs and define the inlet and outlet openings while enabling the discs to be formed easily as imperforate rings and avoiding axial compression and the resultant shrinkage of the filter material.

A more detailed object is to form the support means of a rigid nonfiltering material constructed in a novel manner to provide support for the filter discs and direct fluid flow while sustaining axial compressive forces which maintain the parts in assembled relation.

Other objects and advantages of the invention will become apparent with reference to the following description and the accompanying drawings.

In the drawings:

FIG. 1 is a perspective view of a filter cartridge having discs and support means therefor embodying various features of the present invention;

FIG. 1a is an enlargement of a part of FIG. 1;

FIG. 2 is an exploded perspective view of a filter disc and a preferred form of the improved support means;

FIG. 3 is a fragmentary diametrical sectional view of the cartridge of FIG. 1;

FIG. 4 is a fragmentary plan view of one member forming part of the preferred form of improved support means;

FIG. 5 is a fragmentary plan view of another member forming part of the preferred form of improved support means; and FIGS. 6, 7 and 8 are views which are similar to FIGS. 5, 4 and 3 respectively and show parts of a modified support means.

The invention is shown in the drawings for purposes of illustration embodied in a support means for a plurality of discs 10 which are imperforate except for a central opening and which are adapted for arrangement with the support means in axial alignment in a stack 12 in a cartridge 14. The cartridge, in addition to the stack of discs and their support means, includes end plates or bezels 16 and straps or bands 18 which extend between and are attached at their opposite ends to the end plates to apply an axial pressure to maintain the cartridge parts assembled with the stack of discs and support means between the end plates.

The cartridge 14 is adapted to be used in conjunction with a filter vessel (not shown) similar to that shown in U.S. Pat. No. 2,604,994. Although this vessel will not be described in detail herein, it may be assumed that it includes an inlet which communicates with the external or outer cylindrical surface of the cartridge and an outlet which communicates with the interior or central opening of the cartridge through central apertures 20 in the end plates. It may also be assumed that the discs 10 and their support means are compressed axially within a suitable press and are bound by the end plates 16 and straps 18 while in the compressed state.

In accordance with the present invention, the discs 10 are supported in the cartridge 14 in a novel manner enabling the discs to be formed simply as flat annular members and avoiding axial compression of the discs tending to shrink the filter material. To this end, the discs alternate in the cartridge with inner and outer support members 22 and 24 which sustain the axial compression within the cartridge 14 and cooperate to define inlet and outlet passageways 26 and 28 for directing the flow of fluid first from the exterior of the cartridge and radially and inwardly to spaces between the filter discs, then axially through the discs to remove foreign matter from the fluid, and finally radially and inwardly from the spaces between the discs and to the interior of the cartridge from which it flows through the central apertures 20 in the end plates. The support members engage each other axially within the inner peripheries of the discs and outside of the outer peripheries of the discs to sustain the axial compressive force retaining the cartridge parts assembled.

The support members, in order to sustain the axial compressive force retaining the pats assembled are formed of a material which, as contrasted to the material of the filter discs, is relatively rigid. One material found to be satisfactory is polypropylene.

The inner support members 22 occupy alternating ones of the spaces between the discs 10 and each comprises a thin, flat inner ring 30 having an inner periphery at least as small in radius as the inner peripheries of the discs. These rings are aligned axially with the inner peripheral portions of two adjacent discs and engage such portions in radially overlapping relation to provide axial support for these portions. Formed integrally with and projecting axially in each direction from the inner periphery of the flat, inner ring of the inner support member is a hub 32. The hub projects axially in each direction from the ring a distance equal approximately to the thickness of the discs, the latter in this instance having a thickness on the order of a few thousandths of an inch greater than the axial projection of the hub in each direction. Extending outwardly from the outer periphery of the inner ring of each support member and across and between adjacent ones of the discs to provide lateral support for and prevent axial collapse of the central portions of the discs between their peripheries are a plurality of central supports 34 having the same thickness axially as the inner ring of the support member. Preferably, these supports are in the form of straight spokes radiating from the inner ring and having a uniform width throughout their lengths.

The outer support members 24 are located in the spaces between the discs 10 intervening between the spaces occupied by the inner support members 22. Each of the outer members comprises a thin, flat outer ring 36 having an outer periphery at least as large in radius as the outer peripheries of the discs. The outer rings are aligned axially with the discs and each engages the outer peripheral portions of two adjacent discs in radially overlapping relation. Formed integrally with the outer periphery of the outer ring of each outer support member is a rim 38 which projects axially in each direction from the ring a distance equal approximately to the thickness of the discs. As in the case of the hubs 32 of the inner support members, the rims in this instance project axially from the outer rings in each direction a distance a few thousandths of an inch less than the thickness of the discs. Radiating inwardly from the inner periphery of the outer ring of each outer support member and extending across and between two adjacent discs to provide lateral support for their central portions are a plurality of outer spokes 40.

As noted above, the support members 22 and 24 cooperate to define inlet and outlet passageways 26 and 28 which open radially with respect to the rims 38 and hubs 32 and into the spaces between the discs 10 occupied by the spokes 34 and 40 of the members for the flow of fluid to be filtered first radially into the spaces from the exterior of the cartridge, then axially through the filter discs and finally radially to the center of the cartridge and through the outlet openings 20 in the end plates 16. In a preferred form of the invention shown in FIGS. 1 through 5, the inlet passageways 26 are defined by the spokes 34 of the inner support member 22 in cooperation with the rims 38 of the outer support member 24. For this purpose, the inner spokes extend radially and outwardly beyond the outer peripheries of the discs to a radius equal approximately to that of the outer peripheries of the rims. The outer ends of the inner spokes then are clamped between the rims where the inlet passage-ways are located.

To form the outlet passageways 28, the spokes 40 of the outer support members 24 project radially and inwardly beyond the inner peripheries of the filter discs 10 and approximately to the inner peripheries of the hubs 32. The inner ends of the outer spokes then are clamped between the hubs with which they cooperate to define the outlet passageways.

In assembling the parts of the cartridge 14, the stack 12 is formed by placing a filter disc 10 on an outer support member 24 with the outer periphery of the disc located within the rim 38 of the support member and with the outer ring 36 of the member underlying the outer peripheral portion of the ring and the outer spokes 40 extending radially across and beneath the disc. Then, an inner support member 22 is placed on the disc in axial alignment therewith. The hub 32 of the inner support member extends through the center hole in the filter disc and engages the upper sides of the inner ends of the outer spokes 40 of the outer support member. The underside of the inner ring 30 of the inner support member then overlaps the inner peripheral portion of the filter disc and the inner spokes 34 extend radially across the disc and beyond the outer periphery of the disc and onto the upper edge of the rim 38 of the outer support member. Next, another disc is laid on the inner support member 22 with the hub 32 of the latter projecting through the central hole of that disc. This process is repeated with the parts assembled in the same sequence throughout the cartridge. After the desired numbers of support members and discs are assembled, they are compressed and placed between the end plates 16 followed by application of the straps 18 to hold the stack in a compressed state.

Within the compressed stack 12, the axial forces are sustained by the rims 38 and the outer ends of the inner spokes 34 on the outer periphery of the stack and by the hubs 32 and inner ends of the outer spokes 40 on the inner periphery of the stack. The discs 10, being only slightly thicker than the axial projections of the rims and hubs from the outer and inner rings 36 and 30 of the support members, are only slightly compressed at their peripheral portions which overlap the rings radially. The discs thus remain substantially in an uncompressed state so that they tend to retain their original size and shape rather than shrink when subjected to the fluid to be filtered. This tends to prolong the life of the discs and avoid bypassing of the fluid in paths extending around rather than axially through the discs.

The spokes 34 and 40, in addition to cooperating with the hubs 32 and rims 38 to define the inlet and outlet passageways 26 and 28 in the preferred construction, also provide axial support for the central portions of the discs 10 and prevent these portions from collapsing axially so as to pull the peripheral edge portions of the discs toward the central portions to permit fluid to flow in paths extending other than axially through the discs. In this instance, there are the same numbers of inner spokes and outer spokes and they are of the same width. To facilitate registry of all of the spokes axially, one inner spoke is extended in length beyond the outer peripheries of the rims as indicated at 42 and each of the latter is formed with an outwardly extending peripheral lug 44 aligned radially with one of the outer spokes for alignment axially with the other lugs of the outer support members and the outer ends 42 of the longer spokes of the inner support members in the final assembly of the members in the cartridge 14.

In a modified construction shown in FIGS. 6, 7 and 8, parts corresponding to parts of the preferred construction bear similar reference numerals with a suffix a. In the modification the inlet and outlet passageways 26a and 28a, instead of being defined by the ends of the spokes 34a and 40a which project between the rims 38a and hubs 32a, are formed by extending each rim and hub axially on one side only of each support member and forming in such extensions angularly spaced recesses which extend radially through the rims and hubs. With this construction, the inner spokes 34a extend outwardly short of the rims and the outer spokes 40a extend inwardly short of the hubs. Each axial projection on each rim engages the rim of the next outer support member and cooperates therewith to define the inlet passageways 26a. Similarly, the axial projection on the hub of each support member engages the hub of the next adjacent inner support member to define the outlet passageways 28a. Suitable angular orienting means (not shown) similar to the spoke extensions 42 and lugs 44 of the preferred construction may be provided to locate the inlet passageways between the outer ends of the inner spokes and outlet passageways between the inner ends of the outer spokes to insure the proper fluid flow.

Assembly of the parts of the modified construction is similar to assembly of the parts of the preferred construction. Also, as in the preferred construction, the support members 22a and 24a of the modified construction sustain the axial compressive forces within the cartridge so that the filter discs 10a are substantially uncompressed during usage and thus shrinkage and bypassing are avoided.

Various embodiments of the invention and modifications thereof other than those shown and described herein will be apparent to those skilled in the art from the foregoing description and modifications and are intended to fall within the scope of the accompanying claims.

I claim:

1. In a filter, the combination of a plurality of imperforate, flat, annular discs of filter material aligned axially and spaced apart axially, a plurality of first support members of rigid material extending into alternating ones of the spaces between said discs and each comprising a thin, flat inner ring having an inner periphery at least as small in radius as the inner peripheries of said discs and aligned axially with and engaging the inner peripheral portions of two adjacent ones of said discs in radially, overlapping relation, a hub integral with said inner periphery of said ring and projecting axially in each direction from the ring a distance equal approximately to the thickness of each of said discs, and a plurality of inner central support parts extending outwardly from the outer periphery of said inner ring across and between adjacent ones of said discs, second support members of rigid material alternating with said first members and extending into the intervening ones of said spaces between said discs, each of said second members comprising a thin, flat outer ring having an outer periphery at least as large in radius as the outer peripheries of said discs and aligned axially with and engaging the outer peripheral portions of two adjacent ones of said discs in radially overlapping relation, a rim integral with the outer periphery of said outer ring and projecting axially in each direction therefrom a distance equal approximately to the thickness of each of said discs, and a plurality of outer central support parts extending inwardly from the inner periphery of said outer ring across and between adjacent ones of said discs, and means applying an axial force clamping said members together axially to hold the same in assembled relation with said discs between said hubs and the rims of the members, said members cooperating to define outer passageways opening radially with respect to said rims and into spaces between said discs occupied by said inner central support parts and inner passageways opening radially with respect to said hubs and into spaces between discs occupied by said outer central support parts.

2. The combination of claim 1 in which said inner central support parts are spokes radiating outwardly from said inner ring and said outer central support parts are spokes radiating inwardly from said outer ring.

3. The combination of claim 2 in which each of said support members has the same number of spokes and angular orientation parts are formed on the support members to facilitate orientation of the members with said spokes in register axially of the members.

4. The combination of claim 1 in which said inner central support parts are spokes extending radially and outwardly beyond the outer peripheries of said discs and their outer ends are clamped between said rims and cooperate therewith to define said outer passageways and said outer central support parts are spokes extending radially and inwardly beyond the inner peripheries of said discs and are clamped between said hubs and cooperate therewith to define said inner passageways.

5. The combination of claim 1 in which said inner central support parts of said first members extend outwardly short of said rims, said rims engage each other axially to sustain the axial force of said clamping means outwardly beyond the outer peripheries of said discs and are formed with angularly spaced radially opening recesses forming said outer passageways, said outer central support parts of said second members extend inwardly short of said hubs, and said hubs engage each other axially to sustain the axial force of said clamping means inwardly beyond the inner peripheries of said discs and are formed with angularly spaced radially opening recesses forming said inner passageways.

* * * * *